May 3, 1932.   R. K. LEE   1,856,646
OSCILLATING JOINT
Filed Feb. 17, 1930

INVENTOR
ROGER K. LEE.
BY
ATTORNEY

Patented May 3, 1932

1,856,646

UNITED STATES PATENT OFFICE

ROGER K. LEE, OF HIGHLAND PARK, MICHIGAN, ASSIGNOR TO CHRYSLER CORPORATION, OF DETROIT, MICHIGAN, A CORPORATION OF DELAWARE

OSCILLATING JOINT

Application filed February 17, 1930. Serial No. 429,007.

This invention relates to oscillating joints, particularly of the type used in spring suspensions and shock absorber riggings of motor vehicles.

The main objects of this invention are to provide yieldable connecting means for the metallic parts of an oscillating joint; to provide an improved structure for preventing relative axial movement of the metallic parts of an oscillating joint; to provide an improved method for permanently placing yieldable means under compression between oscillating members; and to provide an oscillating joint having a plurality of yieldable rings which are securely held under compression and in spaced relation by the formation of the outer oscillating part.

An illustrative embodiment of this invention is shown in the accompanying drawings, in which.

Figure 1:
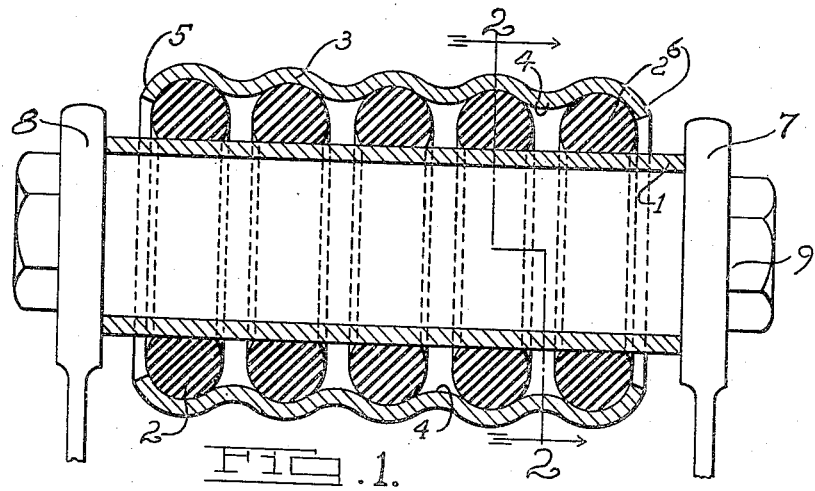
Fig. 1 is central longitudinal section of an oscillating joint embodying my invention.

Heretofore, in the construction of joints of the type which have yieldable connecting means permanently held under compression between a pair of sleeves, it has been customary to insert a single integral ring or cylinder between the sleeves under hydraulic pressure.

In the present invention, a plurality of individual rings of yieldable material are arranged in spaced relation on the outer periphery of the inner sleeve and the inner sleeve together with the rings are inserted into an outer sleeve having a diameter large enough to accommodate the rings when they are in an expanded condition. Annular corrugations are then formed in the outer sleeve by rolling or other suitable operations, so as to compress the rings and provide constrictions in the spaces therebetween.

In the form shown, my improved oscillating joint comprises an inner sleeve 1 having a plurality of longitudinally spaced rings 2 thereon, preferably comprising rubber or other yieldable material, and an outer sleeve 3 which is corrugated annularly. The corrugations or restrictions 4 extend inwardly into the space between the adjacent rings securing them in spaced relation and the end portions 5 and 6 of the outer sleeve 3 are bent or formed inwardly for preventing displacement of the rings 2 at the respectively opposite extremities of the sleeve 3.

Figures 2, 3:
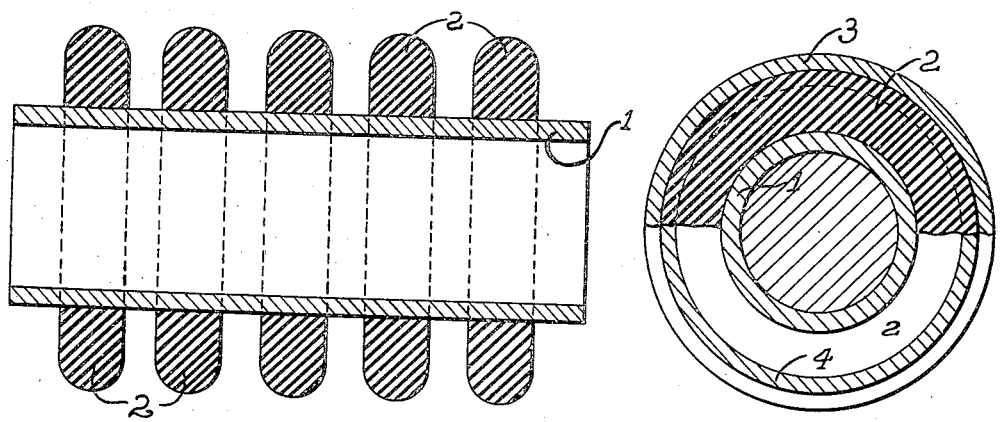
Fig. 2 is a vertical section taken on line 2—2 of Fig. 1.
Fig. 3 is a longitudinal central section of a partly assembled joint showing connecting members as they appear before they are placed under compression.

When the parts of the joint are assembled, the rings 2 are arranged in spaced relation upon the inner sleeve 1 while they are in their expanded state as shown in Fig. 3. Then the inner sleeve together with the rings is inserted into the outer sleeve 3 which is slightly oversize. The outer sleeve is then rolled or otherwise formed so as to produce the corrugated structure shown in Fig. 1. During this forming operation, the constrictions are formed in the spaces between the adjacent pairs of rings and the latter are placed under compression. Compression of the rings causes them to tightly grip the outer surface of the inner sleeve 1, thereby preventing axial movement of the sleeve 1 with respect to the rings 2 while the constrictions 4 in the outer sleeve 3 prevent it from moving axially relative to the rings 2. The end portions 5 and 6 of the outer sleeve are simultaneously burred inwardly during compression of the rings and formation of the constrictions 4.

In operation, in spring suspensions for example, shackle bars 7 and 8 are firmly secured by a bolt 9 on the respectively opposite extremities of the inner sleeve 1 which protrude beyond the extremities of the outer sleeve 3 so as to prevent metal to metal contact between the outer sleeve and the shackle bars. The outer sleeve 3 is firmly held in a support, not shown in the drawings, and the yieldability of the rings 2 permits limited oscillation of the sleeve 1 and bars relative to the sleeve 2 and the support upon which it is mounted. The particular formation of the outer sleeve 1, embodied in this invention, prevents relative axial movement of the parts which the joint connects and retains these parts in proper alignment.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. An oscillating joint comprising an inner sleeve, a plurality of yieldable rings on said sleeve, and an outer sleeve surrounding said rings having peripheral grooves therein, each of said rings being seated in one of said grooves.

2. An oscillating joint comprising an inner sleeve, spaced rubber rings on the outer periphery of said inner sleeve, and an outer sleeve surrounding said rings having corrugations therein for holding said rings in spaced relation.

3. An oscillating joint comprising an inner sleeve, spaced rubber rings on the outer periphery of said inner sleeve, an outer sleeve surrounding said rings having corrugations therein for holding said rings in spaced relation, and inwardly formed end portions on said outer sleeve partially closing the ends thereof.

4. An oscillating joint comprising an inner sleeve, a plurality of yieldable rings on said sleeve, an outer sleeve around said rings permanently retaining the same under compression, and constrictions in said outer sleeve for holding said rings apart and preventing relative movement of said outer sleeve and rings, the inner periphery of said rings being compressed against the outer periphery of said inner sleeve.

5. The method of making an oscillating joint which consists in arranging a plurality of yieldable rings on the outer periphery of a sleeve in spaced relation, inserting the sleeve and rings into an outer sleeve, and forming corrugations in said outer sleeve between said rings so as to compress the latter and prevent their displacement.

6. The method of making an oscillating joint which consists in arranging rubber rings on a member, inserting said member and rings into an outer sleeve, rolling corrugations in said sleeve between said rings for placing said rings under compression, and forming the ends of said sleeve inwardly.

7. An oscillating joint comprising an inner sleeve, a plurality of yieldable rings on said inner sleeve, and an outer sleeve surrounding said rings having inwardly drawn portions extending between portions of said rings for permanently placing said rings under compression and securing the same against displacement.

ROGER K. LEE.